(12) United States Patent
Mills

(10) Patent No.: US 6,349,905 B1
(45) Date of Patent: Feb. 26, 2002

(54) VERSATILE PORTABLE APPARATUS FOR SUPPORTING CAMERAS, SPOTTING SCOPES AND OTHER SUPPORTABLE DEVICES

(76) Inventor: James Everett Mills, 13805 Shady Shores Dr., Tampa, FL (US) 33613-4141

( * ) Notice: Subject to any disclaimer, the term of this patent is extended or adjusted under 35 U.S.C. 154(b) by 0 days.

(21) Appl. No.: 09/010,690

(22) Filed: Jan. 22, 1998

(51) Int. Cl.[7] .............................................. A47G 29/00
(52) U.S. Cl. ................. 248/126; 248/219.4; 248/278.1; 248/558
(58) Field of Search .............................. 248/126, 219.4, 248/278.1, 558, 176.1, 168, 309.1, 288.11, 187.1, 181.1, 181.2; 354/81, 293; 352/243; D16/242, 244

(56) References Cited

U.S. PATENT DOCUMENTS

| | | |
|---|---|---|
| 856,610 A | 6/1907 | Steindorf |
| 1,170,096 A | 2/1916 | Nicholson |
| 1,198,766 A | 9/1916 | Ramsay |
| 2,188,237 A * | 1/1940 | Weaver ...................... 248/168 |
| 2,375,214 A | 5/1945 | Creedon |
| 2,560,884 A * | 7/1951 | Nagourney .............. 248/124.1 |
| 2,806,416 A * | 9/1957 | Jones, Jr. .................... 294/139 |
| 3,351,988 A | 11/1967 | Jamieson |
| 3,881,675 A | 5/1975 | Matchett |
| 3,966,101 A | 6/1976 | Taylor |
| 4,029,246 A | 6/1977 | Woodruff |
| D257,261 S | 10/1980 | Shinohara |
| 4,317,552 A | 3/1982 | Weidler |
| 4,325,529 A | 4/1982 | Seebinger |
| 4,439,032 A | 3/1984 | Congdon |
| 4,640,482 A | 2/1987 | Rogers |
| 4,648,697 A | 3/1987 | Kawazoe |
| 4,886,230 A | 12/1989 | Jones |
| 5,037,053 A | 8/1991 | Fox |
| 5,275,364 A | 1/1994 | Burger |
| D347,160 S * | 5/1994 | Hallgren ...................... D8/355 |
| 5,332,136 A | 7/1994 | Rudolph |
| 5,351,923 A | 10/1994 | Booth, Jr. |
| 5,360,196 A * | 11/1994 | DiGiulio et al. ............ 248/576 |
| 5,433,358 A | 7/1995 | Millard |
| D363,945 S | 11/1995 | LaBree |
| 5,497,214 A * | 3/1996 | Labree ....................... 396/428 |
| 5,510,863 A | 4/1996 | Kliewer |
| 5,538,212 A | 7/1996 | Kennedy |
| 5,551,655 A | 9/1996 | Berger |
| 5,622,432 A * | 4/1997 | Mills .......................... 248/126 |

FOREIGN PATENT DOCUMENTS

FR    2378-232    1/1977

OTHER PUBLICATIONS

Bogen Super Clamp System by Bogen Photo Corp Jan.1, 1985.
Cullman Clamp Magic by Cullman Jan.1,1985.
Cullman Touring Set by Cullman Jan.1,1985.
Sima Video Prop by Sima Jan.1,1985.
Cullmann Travel Pod by Cullmann Jan.1,1985.

* cited by examiner

Primary Examiner—Anita King

(57) ABSTRACT

A portable support for cameras, spotting scopes, and other devices is shown secured to a collateral support object (tree). A rope or strap encircles a collateral support member and the collateral support object (FIG. 1) one or more times, and is then tightly placed in rope gripping clamps. An adjustable arm extends from the collateral support and includes an optical device mounting head, which in turn receives an optical device. Adjustable support is thereby provided for the optical device. The collateral support member interconnects with adjustable legs imparting the capability to configure the apparatus in a free standing mode.

4 Claims, 6 Drawing Sheets

FIG 4
Fig 4A
Fig 4B
Fig 4C
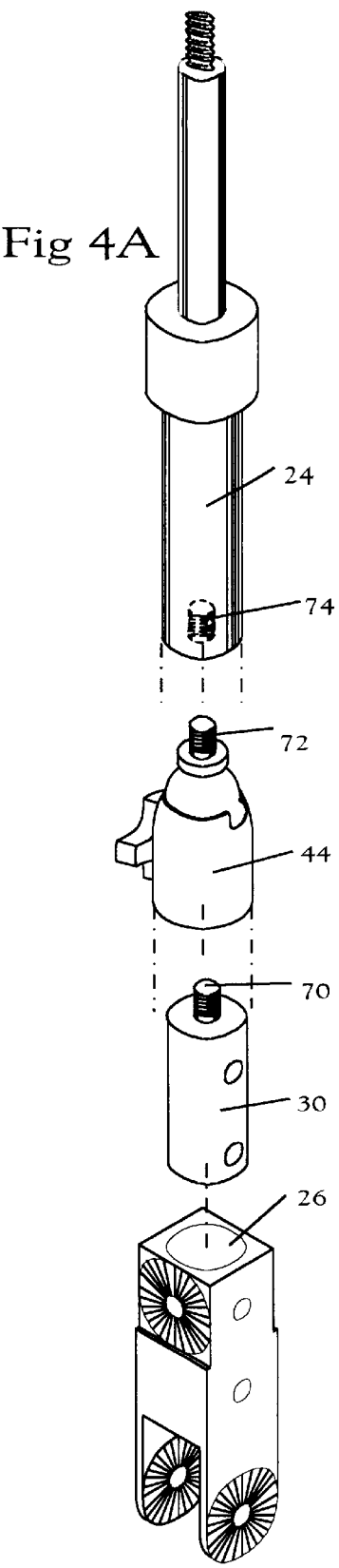
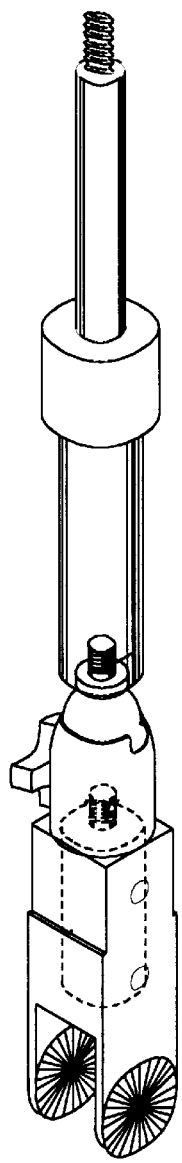
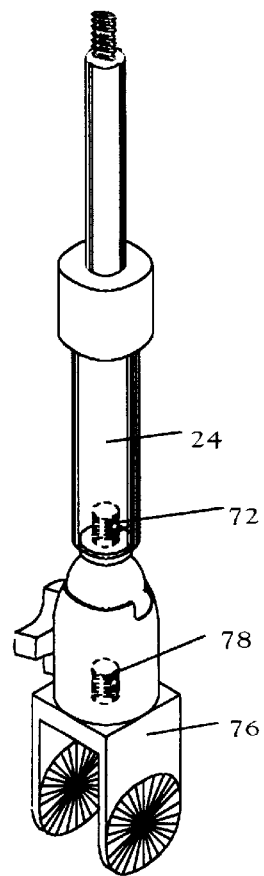

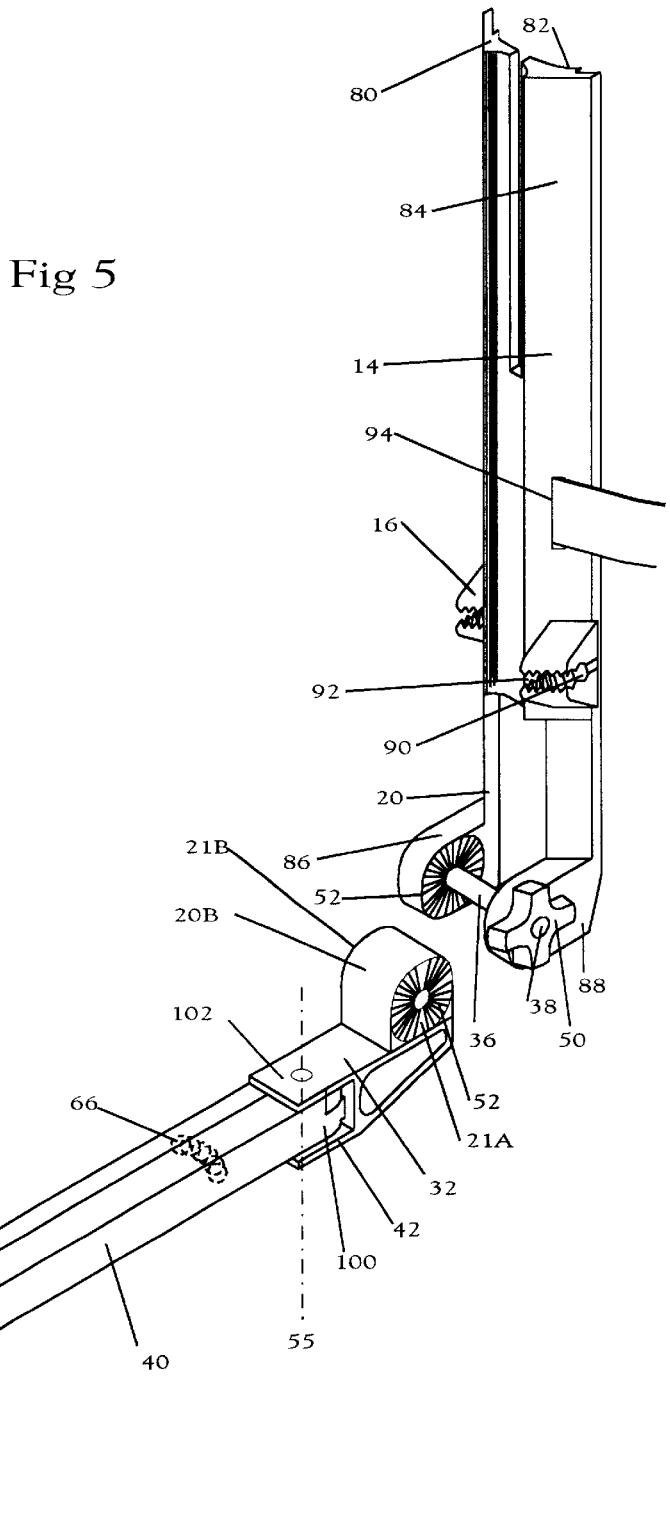

VERSATILE PORTABLE APPARATUS FOR SUPPORTING CAMERAS, SPOTTING SCOPES AND OTHER SUPPORTABLE DEVICES

BACKGROUND—FIELD OF INVENTION

The present invention relates to portable devices for the support of optical instruments such as cameras, scopes, and the like, and more particularly to such devices that may be attached to supplemental support objects.

OBJECTS AND ADVANTAGES

It is an object of this invention to provide a support for spotting scopes, cameras, binoculars, firearms and other devices that is easily pack-able and transportable by the user.

It is another object of this invention to provide such a support that is easily adjusted to a compact size and is of light weight.

It is yet another object of this invention to provide such a support that can be easily and securely attached to collateral support objects such as trees, limbs, posts, and other structures.

It is yet another object of this invention to provide such a support that can be attached easily, securely, quietly and without damage to the collateral support object, utilizing readily available securing means, such as common cord or rope, and/or conventional straps and buckles.

It is yet another object of this invention to provide such a support that can be easily adjusted, both horizontally, (laterally), vertically, and extendably, while attached to a companion support object or set upon a generally horizontal support surface.

It is yet another object of this invention to provide such a support that can extendably support optical devices, including firearms, independently of collateral support objects.

It is yet another object of this invention to provide such a support that can utilize the body of the user as a companion support object.

It is yet another object of this invention to provide such a support that includes means for supporting a variety of devices that do not include conventional means for attaching optical devices.

It is yet another object of this invention to provide such a support that includes means for attachment to planar surfaces, such as windows and the like.

It is yet another object of this invention to provide versatility by including attachments and adapters to broaden the scope of the invention.

It is yet another object of this invention to provide novel and versatile means for attachment of supported devices to the invention.

Still further objects and advantages will become apparent from a consideration of the ensuing description and accompanying drawings.

BACKGROUND—DESCRIPTION OF PRIOR ART

Supports for optical devices have long been used to add needed stability. Photographic devices require stability to accommodate various exposure settings. Telescopes require stability to accommodate various levels of magnification. Firearms require stability to accommodate accuracy. While there are many support devices designed to provide such stability, most are somewhat bulky, weighty, and inconvenient to carry afield. When traditional support devices are sized and weighted to make them more convenient to carry afield, they all suffer from significant limitation, such as being too short. Hunters, hikers, campers, skiers, climbers and other outdoor enthusiasts are in need of a support device that does not suffer from the limitations of current such devices.

U.S. Pat. No 4,439,032 to Jon M. Congdon (Mar. 27, 1984), Congden discloses a portable camera support which includes a conventional camera mounting assembly affixed to a stationary leg. Congden's device is suitable for supporting small cameras on table tops or even attached to some companion objects by use of a hook and loop strap. This device fails to meet many needs of the outdoor user. When deployed in a three-legged mode, the three legs are not adjustable. This is a serious limitation when the user is on uneven or angular terrain. Further, this device has no provision for panning horizontally, while at the same time maintaining the camera mounting assembly in a rigid state so as to prevent the camera from falling or rotating out of the horizontal plane; it is instead, expected that the user will rotate the entire device upon the horizontal support surface to effectuate a panning motion. This is a serious limitation when used on uneven or angular terrain. Further, while it is suggested that other conventional camera mounting assemblies may be employed, no provision is made for the attachment of such assemblies. Further, when Congden's device is attached to a companion support object, such as a tree, the camera mounting assembly is in very close proximity to the support object. This is a very serious limitation for the user of video cameras, spotting scopes and other devices that require adequate clearance for panning and rotation to accommodate the view desired by the user. Further, When using a companion support device such as a tree, it will frequently be desirable for the user to comfortably seat himself on the ground or other surface and adjustably support a camera or other optical device above or to the side of his head so as to position an optical device in front of the users eyes for convenient hands free viewing. Congdon's device is not capable of such use. Further, Congden recommends the use of a hook and loop strap, attached to his device as a means to attach it to companion support objects. Frequently, the user will need to utilize a support object that is too large or bulky for the attached strap. Since the device has no provision for securely, conveniently and quickly releasably locking the securing strap other than the use of hook and loop on the strap itself, the user will not be able to conveniently substitute another longer or more suitable attachment method, such as a rope or cord. Further, the outdoor user will often need to use a support device in an area where there is no tree or other like companion support, and where there is no horizontal flat table top like support available at a usable height. Because Congden's device is not capable of vertical extension, it is impossible to adjust the vertical height of the camera independently of the companion support object. This is a most serious limitation.

Yet another commercially available product is the Cullman Travelpod, by Cullmann. This device resembles Congdon's device but is further limited in that it provides no means for attachment to a companion support object, and no means for adjustment for varied terrain. It is limited to level horizontal surfaces, or hand held use.

In U.S. Pat. No. 1,198,766 to Burt Ramsay (Sep. 19, 1916) Ramsay discloses a tripod type camera support utilizing a single non extendable leg offset against an opposing leg incorporating a pivoting split leg design. Additionally, each of the three feet of the legs is knife edged. Ramsay's support is seriously limited in that no provision is made to secure it to vertical companion support objects except those of soft enough material to receive the knife edged feet. Further, such feet will tend to do serious and lasting damage to the companion support object, or to horizontal support objects such as auto hoods, tables etc. without installation of some form of protective device, adding to it's inconvenient use. Further, there is no capability of vertical or horizontal extension, further limiting the utility of the device. Further, the provided system for attachment to companion support devices is inherently dangerous in that a valuable camera or scope may be damaged by the likely loosening and dislodging of the knife feet in use.

In U.S. Pat. No. 1,170,096 to James M. Nicholson (Feb. 1, 1916) Nicholson discloses a tripod, with sharp feet on each tripod leg. He teaches that the tripod is to be used in a manner similar to the Ramsay device. The Nicholson device suffers from the same serious limitations as the Ramsay device.

The Bogen Super Clamp System by Bogen Photo Corp is a commercially available product. The Bogen Super Clamp System is an expensive family of devices designed to enable the user to support photo devices in a variety of ways. The basis of the system is a friction-lined and screw operated jawed device. Once the jawed device is attached to a companion support object, other attachments and devices can be affixed to the clamp. Such attachments are designed to secure to photographic equipment so as to support the equipment in a stable and convenient position. Such auxiliary attachment devices include The Bogen Magic Arm System.

The Magic Arm System is a two armed device, jointed elbow like, adjustable elbow like, and attachable to the Super Clamp System. Because all of the auxiliary support attachments are dependent upon the limitations of the Super Clamp itself, the system is useful only when in the proximity of a sturdy companion support object of no more than two inches wide. Even if the Super Clamp were constructed so as to fit large companion support objects the device would suffer from excessive bulk, weight, complexity of use, multiple parts, and excessive expense. Further, the Super Clamp System makes no provision for the support of photo devices on solid, planar type surfaces like tables, auto hoods, or the ground.

Yet another commercially available product is the Cullmann Touring Set by Cullmann. The Cullmann Touring Set is a collection of photo equipment support devices primarily dependent on a "C" type clamp mechanism for attachment to companion support objects. Accordingly it suffers from the same serious limitations of U.S. patent all clamp type devices. The Set also includes suction cup and spike type attachments. These attachments are very limited and do not provide the utility or convenience of my invention.

Yet another commercially available product is the Sima Video Prop by Sima. The Sima Video Prop is an extendable camera support device designed to support a camera secured on one end while the opposing end rests on the body of the user, supported additionally by a neck encircling strap. This device lacks the capability to be stabley and conveniently secured to vertical or horizontal companion support objects, which is a very serious limitation when compared to my invention. Further, my invention includes the capability to support an optical device in convenient proximity to the users face and eyes while secured to the users body with a cord or strap attached to my invention and about the neck or body of the user.

In U. S. Pat. No. 5,510,863 Kliewer shows Pocket Tripod kliewer's device attempts to address similar objectives of my invention. However, the device suffers a lack of adjustability as to supporting legs and utilizes a proprietary cord that includes threaded stems and prescribed length, for attachment to support objects, rather than readily available materials such as common rope or cord as is the case with my invention. Additionally no provision is made for adjustability of support legs to accommodate uneven terrain.

In U.S. Pat. No. 5,037,053 Fox discloses a device is not intended to be portable which is supported only by a rigid vertical support post, sized and shaped specifically to accommodate the device. Further, Fox's device does not provide for adjustment of the means for binding to a vertical support post. Fox therefore is unable to accommodate collateral support objects of variable size, shape, or orientation. Additionally the Fox device makes no provision for a free standing mode.

ADDITIONAL PRIOR ART COMMENTS

In U.S. Pat. No. 3,966,101 Taylor discloses an arm engaging camera support which embraces the forearm of the user with straps. Taylors device makes no provision for adjustment of a supported device once attached, nor any provision for use in a free standing mode. My invention is attachable to the user's arm, and therefore enjoys the benefits of Taylor and additionally many additional capabilities.

In U.S. Pat. No. 4,029,246 Woodruff discloses a camera support intended for use in automobiles. Woodruff's device makes no provision for attachment to supplementary support objects. My invention is attachable to multiple support objects in automobiles, and therefore enjoys the benefits of Woodruff and additionally many additional capabilities.

In U.S. Pat. No. Des. 363,945 LaBree discloses an ornamental design which lacks any ability to be free standing. Further, the LaBree device provides no capacity for extension from a support object.

U.S. Pat. No. 3,351,988 by Jamieson shows a camera support clamp bearing little resemblance to my invention.

In U.S. Pat. No. 5,351,923 Booth Jr. provides a support attachable to trees or posts in very limited ways. Further, Booth device makes no provision for a free standing mode.

In U.S. Pat. No. 5,551,655 Burger provides a support that requires a mounting between to spaced surfaces. Means are not provided for attachment to a single collateral support object in a variety of angles and orientations.

In U.S. Pat. No. 4,648,697 Kawazoe provides an adapter to be attached to one of the three legs of a tripod. His adapter is configured so as to serve as a handle for carrying the tripod, and alternatively, as a supplemental camera support. Kawazoe makes no provision for the extension or horizontal adjustment when used to support a camera.

In U.S. Pat. No. 4,640,482 Rogers presents a tripod enabling the simultaneous release and constriction of all three legs with one mechanism. As such, his device provides no means for attachment to a collateral support object nor does it overcome the difficulty of manual positioning of simultaneously loosened legs.

In U.S. Pat. No. 4,317,552 Weidler provides a tripod with three legs simultaneously releasable and adjustable. No Provision is made for attachment to a collateral support object.

In patent No. D257,261 Shinohara presents a tripod design that appears to provide a capability to radially adjust a center post about an axis at a hub. No claim is made as to attachability to a collateral support object. Further, it appears that the center post would, by virtue of the lower end of the extendable center post conflict with a collateral support object.

In U.S. Pat. No. 4,886,230 Jones presents a tripod device which generally meets a number of the objects of the present invention. However, Jones's device differs in several meaningful ways. The center post terminates a central hub unit rather that adjustably passing through. No provision is made for the attachment of commercially available optical device attachment and adjustment heads. No provision is made for attachment of the device to collateral support objects. Further, Jone's device call for construction involving hydraulic shaft and leg adjustment means, an expensive and complex requirement.

In U.S. Pat. No. 4,325,529 Seebinger shows a mounting bracket capable only of horizontal adjustment and as such includes none of the features of the present invention.

U.S. Pat. No. 5,332,136 to John Rudolph shows an optical instrument support apparatus designed for hand and body support of optical devices. Rudolph provides no free standing capability nor means for attachment to collateral support objects.

U.S. Pat. No. 2,375,214 to N. J. Creedon shows support for cameras designed to be screwed into collateral support objects. As such Creedon provides no free standing capability nor means for attachment to support objects not penetrable by a screw.

U.S. Pat. No. 856,610 to Steindorf show a conventional tripod apparatus modified so as to enable spike like pods to penetrate a collateral support object. As such Steindorf's device provides no means for non-penetrating attachment to objects and is therefore very limited.

French Patent FR 2378-232 to Pflieger for attachment to the users body and lacks the important features of the present invention.

SUMMARY

The present invention comprises a versatile portable apparatus for supporting cameras, spotting scopes, and the like, by means of attachment to supplementary support objects and alternatively in a free standing mode. Further positional adjustments of the supported object are achieved by rotational adjustment so as to enable positioning of the supported object at the convenience of the user.

BRIEF DESCRIPTION OF THE DRAWINGS

FIG. 3A shows how 2 lateral arm hubs are assembled.

FIG. 3B shows 2 lateral arm hubs assembled.

FIG. 3C shows the addition of an arm member to the assembly of FIG. 3B.

FIG. 3D shows the addition of an optical device mounting head to the assembly of FIG. 3C FIG. 4 shows an adjustable arm assembly FIG. 4A shows an adjustable arm assembly comprising a lateral arm hub, an arm mounting insert, an optical device mounting head, and an arm member.

FIG. 4B shows an assembly of the components of FIG. 4A.

FIG. 4C shows an adjustable arm assembly including a short arm hub.

FIG. 5 shows a collateral support attachment member.

FIG. 6 shows an elongated leg assembly.

Figure 1:
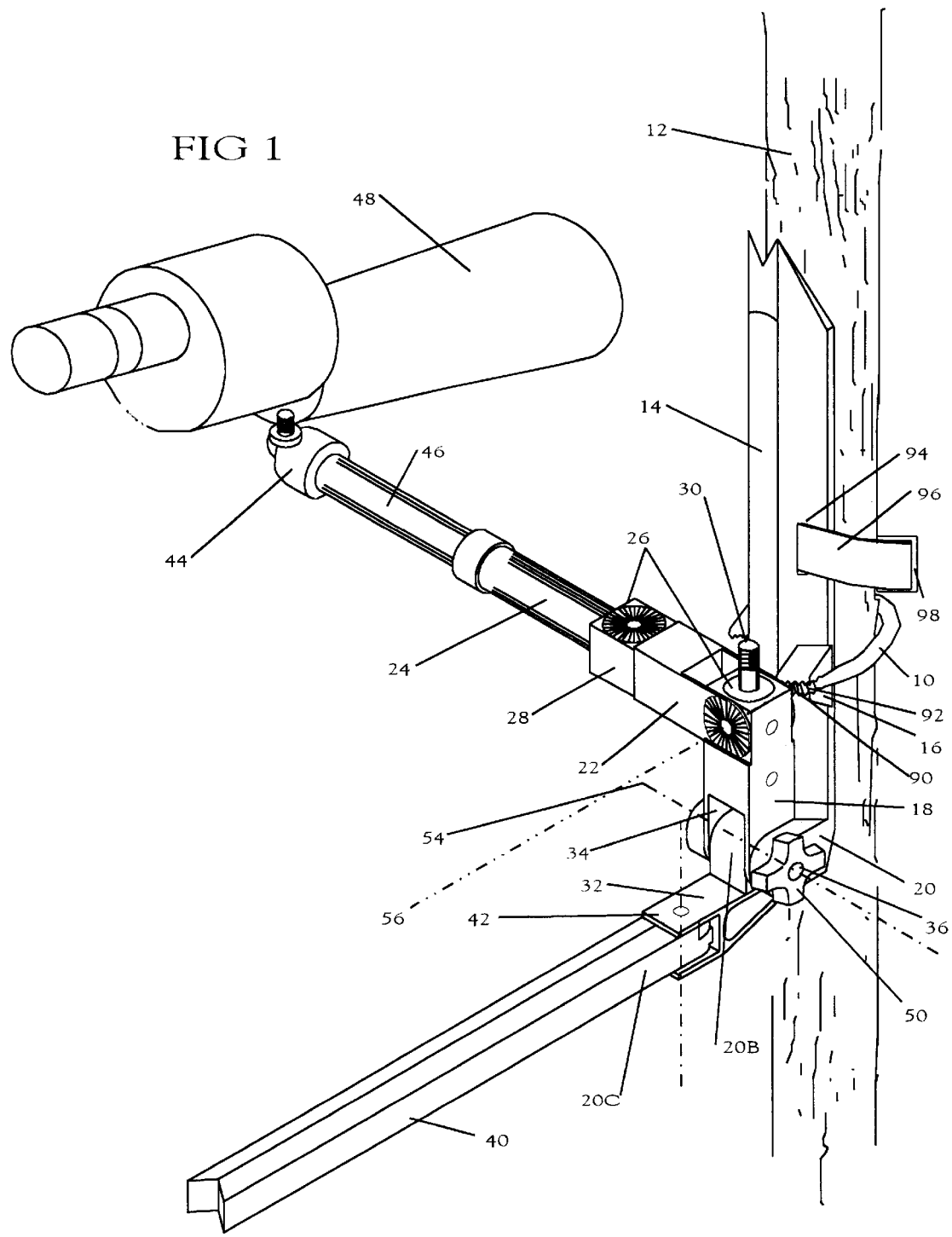
FIG. 1 is a view of my device affixed to a tree (support object).

REFERENCE NUMERALS 10 rope
12 collateral support object
14 collateral support attachment member
16 rope gripping clamps
18 first lateral arm hub member
20 hub end
20A hub end
20B hub end
20C hub end
21A exterior face
21B exterior face
22 second lateral arm hub member
24 arm member
25 curved arrow
26 lateral hub insert receiving hole
28 upper end
30 arm mounting insert
32 elongated leg hub
34 locking tab end
34A locking tab end
36 central rotation bolt
38 central rotation bolt apertures
40 elongated legs
42 tab end
44 optical device mounting head
46 extended end
48 optical device
50 tightening knob
52 radial locking grooves
54 central rotation axis
55 elongated leg rotational axis
56 arm member lateral rotational axis
58 lateral hub bolt
60 lateral hub aperture
62 lateral hub rotation control knob
64 elongated leg spread catch
66 elongated leg spread spring
68 lateral arm hub locking tabs
70 arm mounting insert receiving bolt
72 optical device mounting head bolt
72 optical device mounting head bolt
74 arm member mounting bolt receiving aperture
76 short arm hub
78 short arm hub mounting bolt
80 cross section profile
82 rear face
84 foot end
86 central hub rotation tab
88 central hub rotation tab
90 sharply corrugated walls
92 rope gripping channel
94 strap retaining slot
96 strap
98 conventional tightening buckle
100 interconnected end
102 elongated leg hub bolt
104 plural leg central hub
154 collateral support attachment member receiving opening]

184 ball type arm hub
186 rotation ball
188 rotation ball enclosure
190 rotation ball tightening means Preferred Embodiment—Description
Attachment to Collateral Support Object (FIG. 1)

Figure 3:
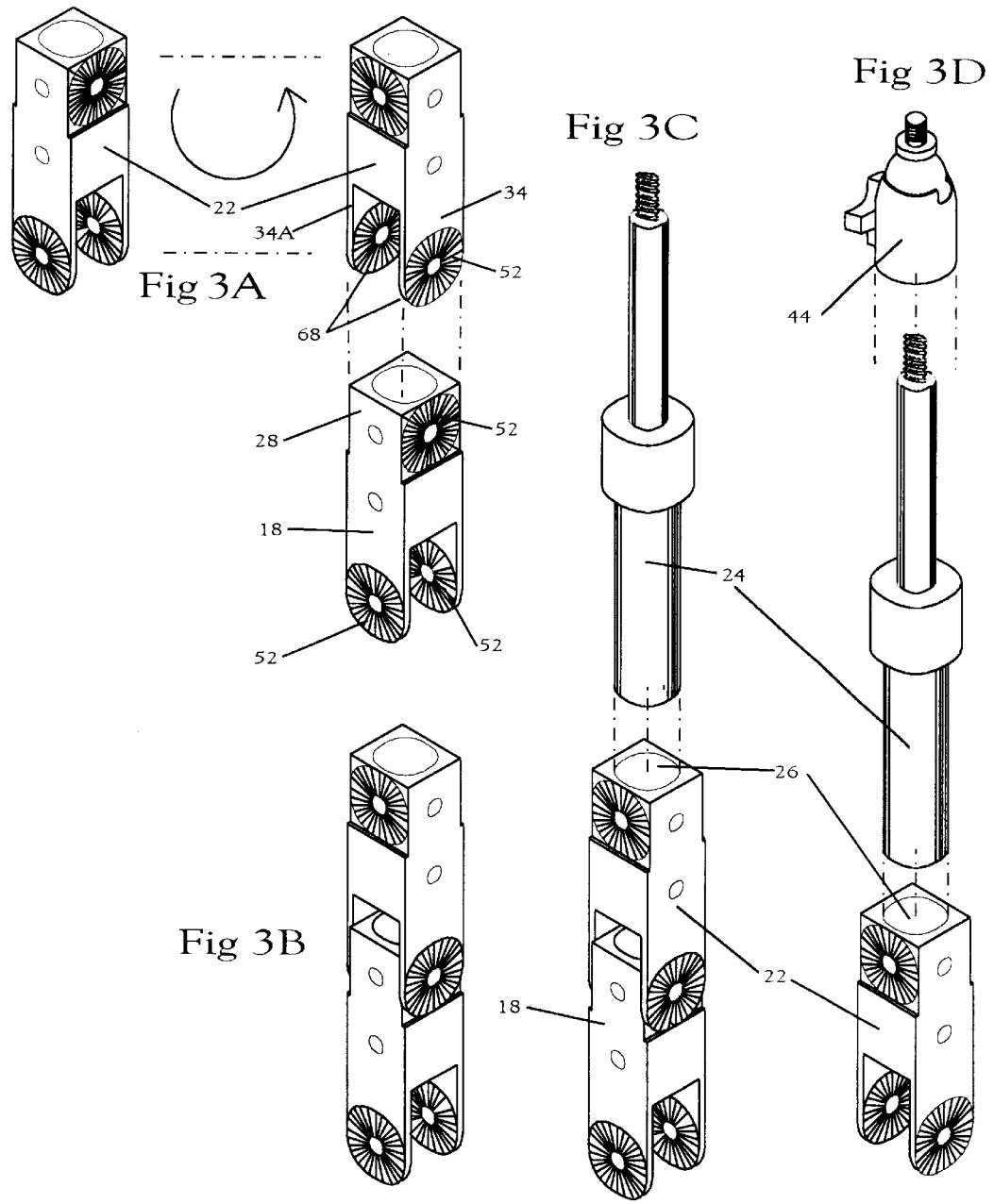
FIG. 3 is an exploded view of a lateral arm hub assembly.

A versatile portable support apparatus for cameras, spotting scopes, and other supportable devices is shown secured to a collateral support object (tree) in FIG. 1. A rope 10 encircles a collateral support object 12 and a collateral support attachment member 14 one or more times, the rope 10 is then tightly secured in rope gripping clamps 16. A first lateral arm hub member 18 rotate-ably interconnects with the hub end 20 of the collateral support attachment member 14. A second lateral arm hub member 22 is oriented so as to rotate-ably interconnect with the first lateral arm hub member 18 Lateral arm hub assembly (FIG. 3).

An arm member 24 is received by the lateral hub insert receiving hole 26 in the upper end 28 of the second lateral arm hub member 22. An arm mounting insert 30 resides within the lateral hub insert receiving hole 26 located in the top if the first lateral arm hub member 18.

An elongated leg hub member 32 rotate-ably interconnects with the hub end 20 of the collateral support attachment member 14 and the locking tab end 34 of the first lateral arm hub member 18. A central rotation bolt 36 passes through central rotation bolt apertures 38 in the hub end 20 of the collateral support attachment member 14 and the locking tab end 34 of the first lateral arm hub member 18 and the hub end 20B of the elongated leg hub member.

The hub end 20C of one or more elongated legs 40 is rotate-ably interconnected in the tab end 42 of the elongated leg hub 32 and secured by elongated leg hub bolt 102 which forms elongated leg rotational axis 55.

An optical device mounting head 44 is connected to the extended end 46 of the arm member 24. An optical device 48 is thereby adjustably connected to the optical device mounting head 44.

The hub end 20 of the collateral support attachment member 14 receives the hub end 20B of the elongated leg hub 32 and the locking tab end 34 of the lateral arm hub member 18 inter-spaced between central hub rotation tab 86 and central hub rotation tab 88. A central rotation axis 54 is formed by the central rotation bolt 36.

Tightening knob 50 compresses radial locking grooves 52 on the interior face of central rotation tab 86 and central rotation tab 88 so as to mesh with radial locking grooves 52 on the exterior of locking tab end 34 and locking tab end 34A. Tightening knob 50 simultaneously compresses radial locking grooves 52 on the exterior face 21A of hub end 20B and the exterior face 21B of hub end 20B so as to mesh with radial locking grooves 52 on the interior face of locking tab end 34 and locking tab end 34A to control rotation of first lateral arm hub member 18 and elongated leg hub 32 and collateral support attachment member 14 about central rotational axis 54.

Rope gripping clamps 16 are partially grooved horizontally and include sharply corrugated walls 90 which form a rope gripping channel 92 (FIG. 5) The rope gripping clamps 16 are arrange so as to grip a rope 10 that is laid within the rope gripping channel 92 and prevent horizontal movement of the rope 10 in one direction only. Each of the rope gripping clamps 16 is arranged so as to prevent rope movement in opposite directions. Alternatively, a single unit (not shown) rope gripping clamp with opposing rope gripping corrugated walls could be utilized.

A strap retaining slot 94 additionally or alternatively contains a strap 96 and a conventional tightening buckle 98 to be used instead of or in conjunction with the rope 10 as a means of securing the support assembly to a collateral support object 12.

Figure 2:
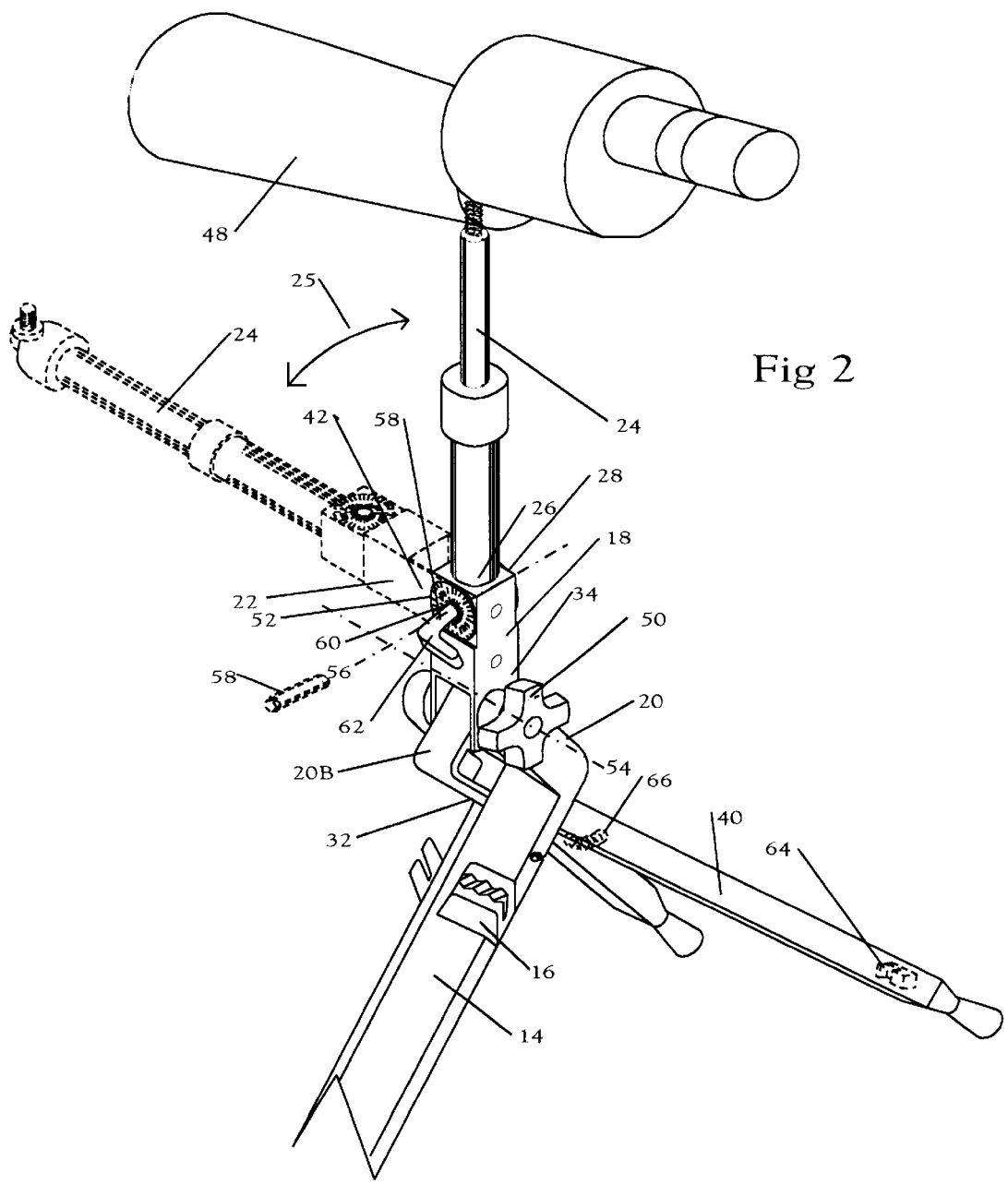
FIG. 2 is a view of my device adjusted to stand on a horizontal support surface.

Free Standing Mode (FIG. 2)

FIG. 2 shows the apparatus configured so as to be free standing on a generally horizontal surface. Elongated leg hub 32 and collateral support attachment member 14 are rotated downward about central rotation axis 54 and locked in place by tightening knob 50 which compresses radial locking grooves 52.

The arm member 24 is inserted into the lateral hub insert receiving hole 26 in the first lateral arm hub member 18. An optical device 48 is mounted atop arm member 24.

The hub end 20 of the collateral support attachment member 14 rotate-ably interconnects with elongated leg hub 32 and first lateral arm hub member 18. A lateral arm assembly as shown in (FIG. 3C) or (FIG. 3D) or an adjustable arm assembly as shown in (FIG. 4B) is additionally rotate-ably interconnected with the hub end 20 of the collateral support attachment member 14 and the hub end 20B of the elongated leg hub 32.

Elongated Leg Assembly (FIG. 6)

Elongated legs 40 (FIG. 6) are rotate-ably interconnected at one end and rotate-ably spread-able at the opposing end. The tab end 42 of the elongated leg hub 32 receives the interconnected end 100 of the elongated legs 40 and are rotate-ably secured by an elongated leg hub bolt 102. An elongated leg spread spring 66 is located between the elongated legs 40 so as to springingly spread the elongated legs 40 apart to form support legs for use of the apparatus in a free standing mode as shown in FIG. 2. Release of elongated leg spread catch 64 enables elongated leg spread spring 66 to spread elongated legs 40 apart.

Second lateral arm hub member 22 may be connected to the upper end 18 of the first lateral arm hub member 18 and the arm member 24 can be inserted into the lateral hub insert receiving hole 26 on the upper end 28 of the second lateral arm hub member 22. FIG. 2 shows a lateral hub bolt 58 passing through a lateral hub aperture 60 forming arm member lateral rotational axis 56. A lateral hub rotation control knob 62 compresses or loosens radial locking grooves 52 on the tab end 42 of second lateral arm hub member 22 and the upper end 28 of the first lateral arm hub member 18. Such a configuration enables horizontal (lateral) rotation of the second lateral arm hub member 22 and the arm member 24 about an arm member lateral rotational axis 56. When arm member 24 is inserted into lateral hub insert receiving hole 26 in the second lateral arm hub member 22 lateral adjustment as shown by curved arrow 25 is enabled. Alternatively, when arm member 24 is inserted into lateral hub insert receiving hole 26 in the first lateral arm hub member 18, lateral adjustment as shown by curved arrow 25 is not enabled.

Lateral Hub Assembly (FIG. 3)

FIG. 3 shows one embodiment of the lateral hub assembly. In FIG. 3A second lateral arm hub member 22 is rotated on a vertical axis as depicted by a curved arrow. Once rotated second lateral arm hub member 22 is mate-ably joined with first lateral arm hub member 18 by positioning the locking tab end 34 of second lateral arm hub member 22 on the upper end 28 of first lateral arm hub member 18 so as to straddle the upper end 28 of first lateral arm hub member 18 with the locking tab end 34 of second lateral arm hub member 22. Radial locking grooves 52 located on the interior faces of the lateral arm hub locking tabs 68 are mate-ably positioned on the radial locking grooves 52 on the exterior faces of the upper end 28 of first lateral arm hub member 18 as shown in FIG. 3B. The resulting lateral arm hub assembly (FIG. 3B), receives arm member 24 inserted into lateral hub insert receiving hole 26 as shown in FIG. 3C. An alternative lateral arm assembly is shown in FIG. 3D, wherein arm member 24 is inserted into lateral hub insert receiving hole 26 of the first lateral arm hub member 18. The assembly shown in FIG. 3D results in a shorter assembly by eliminating the second lateral arm hub member 22, at the cost of the ability to adjust the lateral arm assembly laterally.

Adjustable Arm Assembly (FIG. 4)

Another alternative configuration of the lateral arm assembly is shown in FIG. 4. FIG. 4A shows an adjustable arm assembly configured by inserting an arm mounting insert 30 into lateral hub insert receiving hole 26 and then mounting optical device mounting head 44 on arm mounting insert receiving bolt 70. Arm member 24 is mounted on the optical device mounting head bolt 72 by screw-ably mating optical device mounting head bolt 72 with the arm member mounting bolt receiving aperture 74. FIG. 4B shows the resulting adjustable arm assembly. FIG. 4C shows an adjustable arm assembly utilizing a short arm hub 76 which receives the optical device mounting head 44 mated screw-ably on the short arm hub mounting bolt 78 followed by mounting arm member 24 on optical device mounting head bolt 72. The resulting adjustable arm assembly benefits from being shorter and more compact. Both configurations as shown in FIG. 4B and FIG. 4C benefit by being adjustable in any plane allowed by the optical device mounting head 44.

Collateral Support Attachment Member (FIG. 5)

The collateral support attachment member 14 is shown in FIG. 5. The cross section profile 80 is shaped so as to provide a generally mate-able profile for the purpose of placing the rear face 82 of the collateral support attachment member 14 adjacent to a collateral support object such as a tree or post and the like. The foot end 84 of the collateral support attachment member 14 contacts a generally horizontal surface, such as a table top, the ground and the like when the assembled support apparatus is configured in a free standing mode as shown in FIG. 2.

Figure 7:
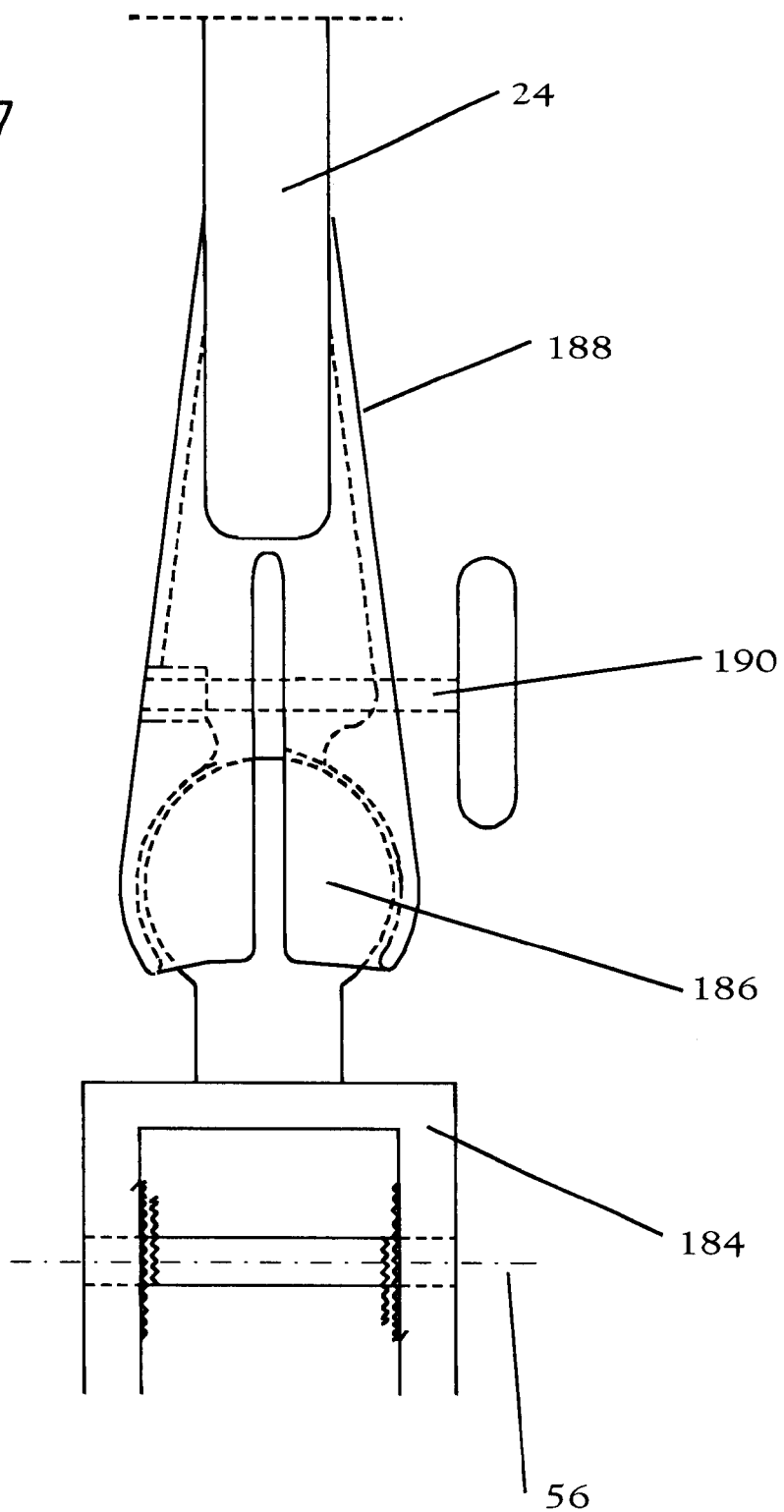
FIG. 7 shows an adjustable ball type arm hub.

Adjustable Ball Type Arm Hub (FIG. 7)

A ball type arm hub 184 is shown as an alternative to the short arm hub 76. A rotation ball 186 is received by a rotation ball enclosure 188. Rotation ball enclosure 188 has rotation ball tightening means 190. The rotation ball assembly receives the arm member 24 on the end opposing the rotation ball 186. This configuration results in an adjustable ball joint as seen in FIG. 7. Such an assembly may be employed as an alternative to the assembly resulting from the combination of short arm hub 76 and optical device mounting head 44 as seen in FIG. 4C.

Preferred Embodiment—Operation

Versatility in support of optical devices and the like is achieved by using the apparatus in the various configurations described, among others not described. It is expected that this apparatus will be used in two primary ways.

Attached to Collateral Support Object (FIG.) 1

FIG. 1 shows an embodiment of the assembled apparatus attached to a collateral support object 12 (tree). Loosening tightening knob 50, allows the free rotation of collateral support attachment member 14 and elongated legs 40 and an assembly of first lateral hub member 18 and second lateral hub member 22, about central rotation axis 54. Collateral support attachment member 14 is then placed adjacent to the collateral support object 12. A rope 10 or a strap 96 is then encircled around the collateral support attachment member 14 and the collateral support object 12 and tightly secured. Use of rope 20 is the preferred method. Rope 20 is tightly secured in rope gripping clamps 16. The rope gripping clamps 16 quickly grip the rope 20 and easily and quickly release the rope 20 by lifting from rope gripping clamps 16. First lateral arm hub member 18 and second lateral arm hub member 22 are identical and are assembled atop one another as seen in FIG. 3. This lateral arm hub assembly is then receives arm member 24 and arm member 24 receives an optical device mounting head 44 and an optical device 48.

Once secured to collateral support object 12, the apparatus can be adjusted as follows. General positional adjustment (horizontal and vertical) is done initially when attaching the apparatus to a collateral support object 12. Further vertical adjustments are made by releasing tightening knob 50, and rotating the arm assembly in a vertical plane. Further horizontal (lateral) adjustments are made by releasing lateral hub rotation control knob 62 and rotating second lateral arm hub member 22. Further adjustments of the supported optical device 48 may be made with optical device mounting head 44. It is not necessary to utilize a collateral support object 12 that is itself vertical. The apparatus may be attached to any suitable collateral support object 12 in any orientation and still provide all the adjustment versatility described.

Free Standing Mode (FIG. 2)

Loosening tightening knob 50 and rotation of collateral support attachment member 14 and elongated legs 40 forms a tripod as shown in FIG. 2. Such a configuration is suitable for placement on supporting surfaces such as tables the ground or the like. It is not necessary that the supporting surface be horizontal as long as rotational adjustment about central rotation axis 54 leaves the arm member 24 and the optical device 48 above the center of gravity of the assembly. This adds significant positional versatility. Further adjustments may be made by rotating the first lateral arm hub 18 and second lateral arm hub 22 as shown in FIG. 2.

Lateral Arm Hub Assembly (FIG. 3)

The support apparatus may employ one or two of the identical lateral arm hub members, 18 and 22 as shown in FIG. 3B and FIG. 3C. Such assembly enables positional adjustment by rotation of the first lateral arm hub member 18 and the second lateral arm hub member 22 about arm member lateral rotational axis 56. Alternatively, FIG. 3D shows the use of only the first lateral arm hub member.

Adjustable Arm Assembly (FIG. 4)

Omni-directional adjustment of a supported optical device may be achieved with the use of arm mounting insert 30 and an optical device mounting head 44. Arm mounting insert 30 is inserted into lateral hub insert receiving hole located in the first lateral arm hub member 18. An optical device mounting head is then attached to the arm mounting insert receiving bolt 70 and the arm member 24 is then mounted by attaching arm member mounting bolt receiving aperture 74 to optical device mounting head bolt 72. Such a configuration enables a user to enjoy all the adjustment flexibility afforded by rotation of first lateral arm hub member 18 plus all of the adjustment capabilities of the optical device mounting head 44. FIG. 4C shows a similar configuration wherein short arm hub 76 is substituted for first lateral arm hub member 18.

Adjustable Ball Type Arm Hub (FIG. 11)

An adjustable ball type arm hub utilizing an adjustable ball and socket configuration as seen in FIG. 11 may be substituted for the assembly seen in FIG. 4C. By using a ball type arm hub 184 which incorporates a rotation ball 186 to receive a rotation ball enclosure 188 rotationally adjustable by adjusting rotation ball tightening means 190 to receive arm member 24 adjustment similar to the configuration seen in FIG. 4 may be achieved without the use of mounting head 44.

Conclusions, Ramifications, and Scope

It should be noted that my invention in its various ramifications is intended to provide versatile support heretofore unavailable. It will be clear to one skilled in the art that a wide variety of materials can be used for construction and a wide variety of combinations, configurations, and simplified assemblies can be accomplished within the scope and spirit of this present invention. Parts may be combined or consolidated, resized and or reshaped for cosmetic appearance. The invention may be made in a wide range of sizes to accommodate a variety of supported objects.

Accordingly, it can be seen that a novel and versatile apparatus, that provides convenient and steady support for cameras, scopes, and the like has been provided. Capable of being compact and lightweight, my invention meets the needs of those outdoor users of objects benefiting from steady support. Serious limitations found in conventional support tools are overcome.

Trees and limbs, fence posts and railings, automobile windows, tables, automobile hoods, horizontal and irregular terrain, utility poles, and the like, at any angle, large or small in size, will serve as collateral support objects. Utilizing readily available rope or straps, puts the user in charge, instead of the tool.

Tightly securable with no knots to tie, means fast and easy attachment to collateral support objects. One knob frees a central rotational assembly, affording deployment and precise positioning, relative to the user and chosen collateral support object, as well as compact folding for transport.

A users choice of supported device mounting assemblies, use of long, short, extendable or non-extendable conventional telescoping or folding arms, and/or legs, add to the versatility and utility of my invention.

The unique combination of a first and a second lateral arm hub enable lateral adjustment of supported objects. Utilization of the disclosed adjustable arm hub utilizing an optical device mounting head or an integral ball-type adjustment means provides significant utility not heretofore found in the art.

Although the description above contains many specificity's, these should not be construed as limiting the scope of the invention but as merely providing illustrations of some of the presently preferred embodiments of this invention. Various other embodiments and ramifications are possible within it's scope. For example, an arm fashioned so as to be fixed, not extendible. An extendible arm fashioned so as to unfold in sections, carpenters rule like. Extendible arm fashioned so as to extend sections with elbow-like connections. Collateral support attachment member fashioned so as to be extendible. Hub rotational locking grooves replaced with conventional friction and compression locking means or the like. Rope gripping clamps replaced or supplemented with any of a wide variety of conventional binding and clamping means. Central locking knob replaced with other conventional handle type locking means. Use of a detachable, or permanently affixed, collateral support attachment member. configured to be attachable to conventional tripods and/or conventional photographic light stand assemblies. Additionally, such well known assembly parts as common nuts and bolts and screws may not be specifically referenced but will clearly be integral to my invention as seen by anyone schooled in the art.

What is claimed is:

1. A support apparatus for optical devices and other supportable objects, comprising;

a fixed or extendible collateral support attachment member, a first lateral arm hub member, and a leg hub member;

said collateral support attachment member and said first lateral arm hub member and said leg hub member rotatably interconnect, thereby forming a central rotational axis about which said collateral support attachment member and said first lateral arm hub member and said leg hub member can rotate in relation to one another;

said first lateral arm hub member having means to rotatably interconnect with a second lateral arm hub member thereby forming an arm hub member rotational axis;

said first and/or second lateral arm hub member having means for attachment of a fixed in length or extendible arm member;

said arm member being fixed or removable;

said arm member having optical device attachment means;

first tightening means for allowing or restricting rotation of said collateral support attachment member and said first arm hub member and said leg hub member about said central rotational axis;

second tightening means for allowing or restricting rotation of said first lateral arm hub member and said second lateral arm hub member about said arm hub member rotational axis;

binding means for attachment to collateral support objects and clenching means for securing said binding means.

2. The support apparatus of claim 1 wherein said leg hub member has means to interconnect with fixed in length or extendible plural legs, said plural legs enabling said support apparatus to be free standing;

said plural legs being fixed or removable.

3. The support apparatus of claim 2 including fixed in length or extendible plural elongated legs, said plural elongated legs enabling said support apparatus to be free standing.

4. The support apparatus of claim 1 wherein;

said first lateral arm hub member and said second lateral arm hub member are replaced by an alternative lateral arm hub member, wherein;

said alternative lateral arm hub member has means to rotatably interconnect with said collateral support attachment member and said leg hub member thereby forming a central rotational axis about which said collateral support attachment member and said alternative arm hub member and said leg hub member can rotate in relation to one another;

said alternative lateral arm hub member comprises means to rotatably interconnect with a either a ball or socket;

said arm member having fixed or removable means to receive said ball or socket;

third tightening means for allowing or restricting rotation of a ball or socket.

\* \* \* \* \*